(12) United States Patent
Nakazono et al.

(10) Patent No.: US 8,724,923 B2
(45) Date of Patent: May 13, 2014

(54) IMAGE PROCESSING APPARATUS AND IMAGE PROCESSING METHOD FOR CORRECTING DISTORTED IMAGE DATA

(75) Inventors: Keisuke Nakazono, Tokyo (JP); Yoshinobu Tanaka, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 303 days.

(21) Appl. No.: 13/190,982

(22) Filed: Jul. 26, 2011

(65) Prior Publication Data

US 2012/0027320 A1    Feb. 2, 2012

(30) Foreign Application Priority Data

Jul. 30, 2010  (JP) ................................. 2010-172157

(51) Int. Cl.
*G06K 9/40* (2006.01)
*G06K 9/32* (2006.01)
*G09G 5/00* (2006.01)
*H04N 11/20* (2006.01)
*H04N 7/01* (2006.01)
*H04N 9/74* (2006.01)
*G06F 7/38* (2006.01)

(52) U.S. Cl.
USPC ........... 382/275; 382/293; 382/300; 345/619; 348/441; 348/580; 708/290; 708/442

(58) Field of Classification Search
None
See application file for complete search history.

(56) References Cited

U.S. PATENT DOCUMENTS

2006/0188172 A1*  8/2006  Higurashi et al. ............. 382/275
2012/0044387 A1*  2/2012  Usami ......................... 348/240.3

FOREIGN PATENT DOCUMENTS

| JP | 2005-045514 A | 2/2005 |
| JP | 2006-229383 A | 8/2006 |
| JP | 2007-267379 A | 10/2007 |
| JP | 4179701 B | 11/2008 |

OTHER PUBLICATIONS

Japanese Office Action dated Feb. 12, 2014, issued in Japanese Patent Application No. 2010-172157, w/English machine translation (5 pages).

* cited by examiner

*Primary Examiner* — Randolph I Chu
(74) *Attorney, Agent, or Firm* — Westerman, Hattori, Daniels & Adrian, LLP

(57) ABSTRACT

An image processing apparatus may include a distortion correcting unit performing distortion correction processing on input image data to generate output image data. The distortion correcting unit may include a distortion correction coordinate transforming unit that obtains coordinates indicating a position of the input image data corresponding to a position of the output image data, a range calculating unit that calculates a range of the input image data to be used in the distortion correction processing based on the coordinates of the input image data obtained by the distortion correction coordinate transforming unit, a correction information storage unit, an input image data storage unit, and an interpolation calculating unit that checks an amount of the input image data stored in the input image data storage unit based on the information regarding the range of the input image data.

9 Claims, 11 Drawing Sheets

GRID TYPE SUBJECT

BARREL TYPE

PINCUSHION TYPE

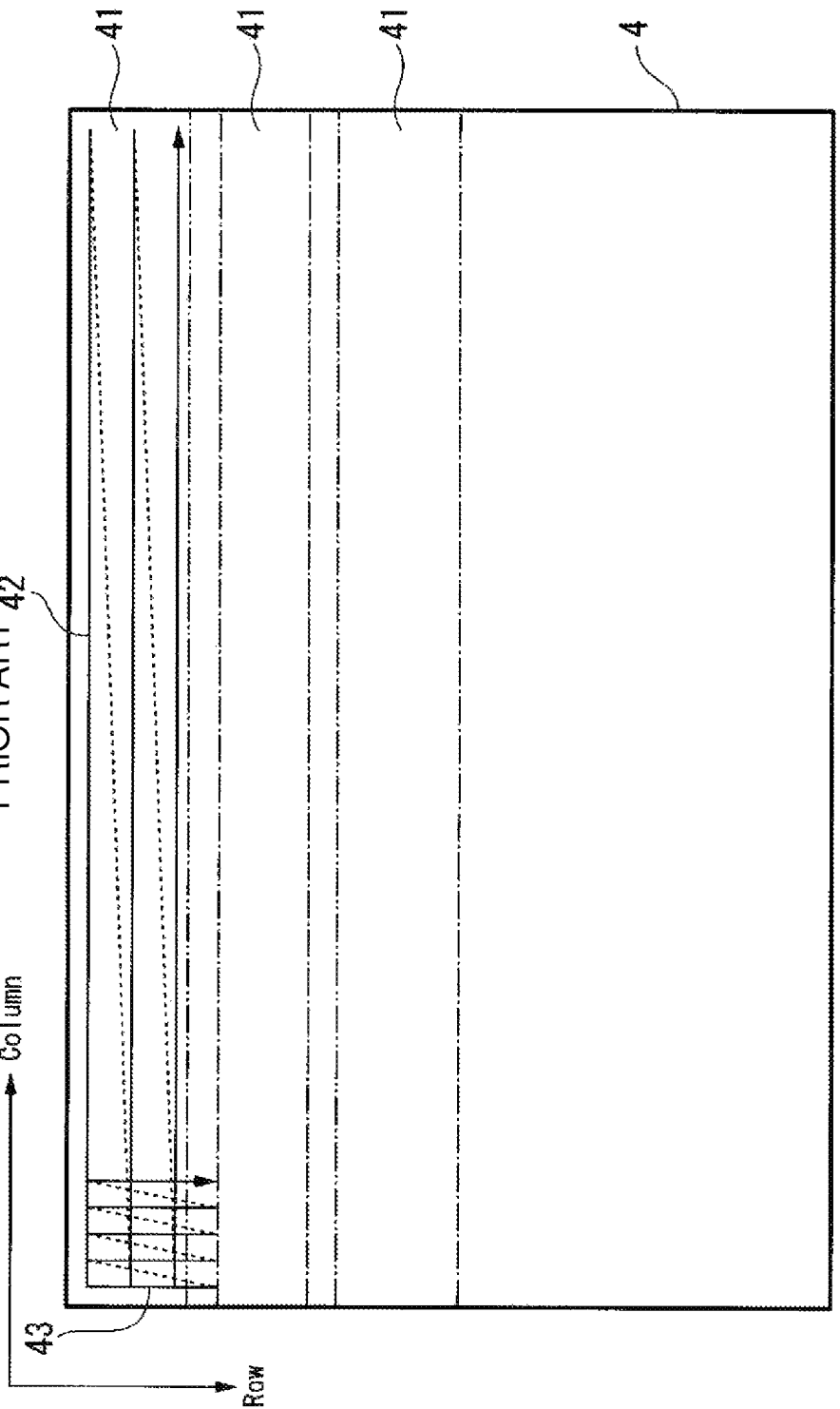

IMAGE PROCESSING APPARATUS AND IMAGE PROCESSING METHOD FOR CORRECTING DISTORTED IMAGE DATA

BACKGROUND OF THE INVENTION

1. Field of the Invention

The present invention relates to an image processing apparatus and an image processing method.

Priority is claimed on Japanese Patent Application No. 2010-172157, filed Jul. 30, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an image processing apparatus such as a still-image camera, a moving-image camera, a medical endoscope camera, or an industrial endoscope camera, for example, a plurality of image processes are performed when one still image is generated. Japanese Patent Publication No. 4179701 discloses an image processing apparatus for performing a plurality of image processes within the image processing apparatus using little memory unit access.

FIG. 5 is a block diagram illustrating a schematic configuration of an image processing apparatus in accordance with the related art. Under control of a CPU 2 that controls each unit connected to a bus 1, the image processing apparatus in accordance with the related art shown in FIG. 5 pre-processes an imaging signal output from a solid-state imaging apparatus such as CCD by a pre-processing circuit 3. The image data pre-processed by the pre-processing circuit 3 is temporarily stored, for example, in a frame memory unit 4 such as a dynamic random access memory (DRAM), via the bus 1. Subsequently, the image process processing unit 5 reads the image data stored in the frame memory unit 4 via the bus 1. After the image process processing unit 5 performs a plurality of image processes on the read image data, their result is output to a Joint Photographic Experts Group (JPEG) processing circuit 6. The image data JPEG-processed by the JPEG processing circuit 6 is re-stored in the frame memory unit 4 via the bus 1.

When each image process is performed in the image processing apparatus in accordance with the related art as described above, access to the frame memory unit 4 via the bus 1 is performed, for example, by direct memory access (DMA). In the image processing apparatus in accordance with the related art shown in FIG. 5, image process circuits (image process circuits 5-1 to 5-n) within the image process processing unit 5 are connected in series to implement the plurality of image processes in a small DMA area by pipeline-processing the plurality of image processes.

Incidentally, a distortion aberration generally occurs in an optical system of a camera. FIGS. 6A to 6C are diagrams illustrating examples of distortion aberrations of an optical system. For example, if an image processing apparatus captures an image of a grid subject as shown in FIG. 6A, the captured image has a barrel distortion as shown in FIG. 6B or a pincushion distortion as shown in FIG. 6C due to the distortion aberration of the optical system.

In recent cameras, optical systems are usually equipped with an optical zoom function, and distortion aberration states in the wide angle side and the tele side such as the barrel distortion appearing in the wide angle side and the pincushion distortion in the tele side are usually varied. Japanese Unexamined Patent Application, First Publication No. 2005-45514 discloses an image processing apparatus including a distortion correcting circuit for correcting a distortion aberration varying with the state of the optical system as the image process circuit.

In the image processing apparatus in accordance with the related art disclosed in Japanese Unexamined Patent Application, First Publication No. 2005-45514, the case where the distortion correcting circuit for correcting the distortion aberration is included, for example, as the image process circuit 5-2 within the image process processing unit 5 of the image processing apparatus of the related art shown in FIG. 5 is disclosed. In the image processing apparatus in accordance with the related art shown in FIG. 5, the JPEG processing circuit 6 performs JPEG processing after image processes are performed by the image process processing unit 5. Because the JPEG processing is performed in units of 8-pixel image data in a horizontal direction, the image process processing unit 5 initially performs aspect conversion on the image data, and outputs the image data to the JPEG processing circuit 6 after performing a plurality of processes for the image data subjected to the aspect conversion. Thus, in the image process circuit 5-2, which is the distortion correcting circuit in accordance with the related art, an aspect conversion circuit (the image process circuit 5-1), which is a preceding-stage image process circuit, acquires the image data temporarily stored in the frame memory unit 4 by DMA, and the image data aspect-converted by the aspect conversion circuit is input as input image data. The distortion correcting circuit in accordance with the related art corrects the distortion aberration of the optical system for the input aspect-converted image data.

Here, the aspect conversion circuit (the image process circuit 5-1), which is a preceding-stage image process circuit that inputs input image data to the distortion correcting circuit of the related art, will be described. FIG. 7 is a diagram schematically illustrating an operation in which the aspect conversion circuit reads image data from the frame memory unit 4 and outputs input image data to the distortion correcting circuit. FIG. 7 shows one-screen image data stored in the frame memory unit 4. The aspect conversion circuit divides the one-screen image data stored in the frame memory unit 4 into areas (hereinafter referred to as block lines) 41 each having a width of the predetermined number of columns. The width of the number of columns of each block line 41 is set so that the area of each block line 41 overlaps that of an adjacent block line 41 with respect to each column-direction area.

The aspect conversion circuit reads image data within the block line 41 in a column direction of the frame memory unit 4 like a read direction 42 shown in FIG. 7. Thereafter, the aspect conversion circuit outputs the read image data of the block line 41 in a row direction of the frame memory unit 4 like an output direction 43 shown in FIG. 7 perpendicular to the column direction. The image data output in the row direction of the frame memory unit 4 like the output direction 43 is input to the distortion correcting circuit as input image data. As described above, the aspect conversion circuit inputs the aspect-converted image data to the distortion correcting circuit. One row (line) of the image data read in the output direction 43 shown in FIG. 7 is referred to as a "unit line."

FIGS. 8A and 8B are diagrams illustrating a schematic configuration and a schematic operation of the aspect conversion circuit. The aspect conversion circuit as shown in FIG. 8A has two small memory units (memory units 511 and 512). Switching control is performed by a control unit (not shown) for the memory units 511 and 512 so that when image data read from the frame memory unit 4 is written to one memory unit, image data written to the other memory unit is read and output to the distortion correcting circuit as shown in FIG. 8B. FIG. 8A shows an example of a state in which image data read from the frame memory unit 4 is written to the memory unit 511 and image data from the memory unit 512 is read and output (read) to the distortion correcting circuit.

When the image data read from the frame memory unit 4 is written to the memory unit 511 or 512, the image data is scanned (raster-scanned) in the column direction of the frame memory unit like the read direction 42 shown in FIG. 7, and divided into, and written to, the block lines 41. The memory unit 511 and the memory unit 512 are, for example, memory units capable of storing data having a burst length of the frame memory unit 4, not memory units capable of storing data having the same length as in the column direction of the frame memory unit 4. Accordingly, the memory unit 511 and the memory unit 512 are memory units having a capacity of (Width of Predetermined Number of Columns×Burst Length).

When the image data stored in the memory unit 511 or 512 is read (output) to the distortion correcting circuit, the image data is read and output while being scanned in the row direction of the frame memory unit 4 like the output direction 43 shown in FIG. 7. As described above, the image data is aspect-converted by changing a direction of writing to the memory unit and a direction of reading from the memory unit.

Next, the distortion correcting circuit (the image process circuit 5-2) that corrects a distortion aberration in the image processing apparatus of the related art will be described. FIG. 9 is a block diagram illustrating a schematic configuration of the distortion correcting circuit in accordance with the related art. A distortion correcting circuit 52 in accordance with the related art shown in FIG. 9 corrects input image data input from the aspect conversion circuit, and outputs output image data after correction to a next-stage image process circuit.

As shown in FIG. 9, the distortion correcting circuit 52 includes an interpolation position generating unit 521, a distortion correction coordinate transforming unit 522, a line memory unit 523, a memory control unit 524, and an interpolation calculating unit 525. The interpolation position generating unit 521 generates an interpolation position indicating a position of output image data to be output after an interpolation. The distortion correction coordinate transforming unit 522 transforms the interpolation position generated by the interpolation position generating unit 521 into coordinates indicating a position of input image data before a distortion correction by applying a distortion correcting equation of a distortion aberration characteristic corresponding to a preset zoom position of the optical system or the like. Thereby, it is possible to obtain the position (coordinates) of input image data to be used for an interpolation to be executed for data of the interpolation position of the output image data generated by the interpolation position generating unit 521.

The line memory unit 523 temporarily stores input image data input from the image process circuit 5-1 for each unit line. Also, the line memory unit 523 includes storage areas for a predetermined plurality of unit lines, and has a form in which the storage areas are connected in a ring shape. It is possible to store input image data of a larger number of unit lines than the predetermined number of unit lines by subsequently rewriting input image data of unit lines unused in an interpolation calculation.

The memory control unit 524 controls the line memory unit 523 based on the coordinates of the input image data before the distortion correction into which the transformation is performed by the distortion correction coordinate transforming unit 522. The interpolation calculating unit 525 generates the output image data by carrying out the interpolation calculation on the input image data stored in the line memory unit 523 based on the coordinates of the input image data before the distortion correction into which the transformation is performed by the distortion correction coordinate transforming unit 522, and outputs the output image data to a next-stage image process circuit.

Here, the interpolation calculation of the distortion correcting circuit 52 in accordance with the related art will be described. If an interpolation calculation of predetermined output image data is performed, the interpolation calculating unit 525 generates output image data, for example, by a bilinear interpolation or a bicubic interpolation, using input image data of a row (line) including input image data before a distortion correction and input image data of the previous or next line including input image data located at its periphery. FIG. 10 is a diagram schematically illustrating an example of the line memory unit provided in the distortion correcting circuit 52 and input image data stored in the line memory unit in accordance with the related art. FIG. 10 shows a storage area capable of storing input image data for 16 lines (unit lines) included as the line memory unit 523, a line of input image data before a distortion correction corresponding to output image data to be interpolated when output image data of one row (line) is output, and a range (the number of unit lines) of input image data necessary for an interpolation calculation. In the example shown in FIG. 10, an example in which output image data is generated by the bicubic interpolation using a line where input image data before a distortion correction corresponding to the output image data is stored, input image data of its previous line, and input image data for up to two subsequent lines.

Incidentally, a distortion shape of each line of an image captured using an optical system having a distortion aberration as shown in FIG. 6 differs according to each line. Thus, the number of lines (the number of unit lines) of input image data necessary for outputting output image data of a predetermined line by the interpolation calculating unit 525 also differs according to each line for outputting the output image data. For example, as shown in FIG. 10, the necessary number of lines (number of unit lines) of input image data differs according to each row (line) from which the output image data is output so that input image data of first to seventh unit lines is necessary if output image data of one row (line) is generated based on input image data shown on a line a and input image data of ninth to thirteenth unit lines is necessary if output image data of one row (line) is generated based on input image data shown on a line b.

However, it is difficult to pre-obtain the number of lines (the number of unit lines) of input image data necessary for outputting output image data of a predetermined line, and it is not possible to obtain the appropriate number of lines of input image data necessary for the interpolation calculation if coordinate transformation is not actually executed. If interpolation processing is performed without obtaining the necessary number of lines of input image data by actually executing the coordinate transformation, for example, if the number of lines of input image data stored in the line memory unit 523 is less than the number of lines of input image data necessary for the interpolation calculation, the processing of the interpolation calculation becomes erroneous without being normally completed. If the processing of the interpolation calculation becomes erroneous, it is not possible to efficiently perform interpolation processing because the interpolation processing is re-executed after the number of lines of input image data stored in the line memory unit 523 is greater than or equal to the necessary number of lines.

Because of this, it is possible to increase the number of lines of input image data stored in the line memory unit 523, that is, the prepared number of unit lines capable of being temporarily stored in the line memory unit 523, as a countermeasure for normally completing the interpolation processing without being affected by a distortion shape of each line. However, because input image data of a unit line unused in actual interpolation processing is also stored, the use efficiency of the line memory unit is degraded. Because it is necessary to prepare more line memory units, this becomes a factor that increases a circuit scale of the distortion correcting circuit.

Japanese Unexamined Patent Application, First Publication No. 2005-45514 also discloses a distortion correcting circuit including a distortion correction range calculating unit that executes a range of input image data before a distortion correction for a range of output image data to be output after an interpolation before the distortion correction is processed. In order to distinguish from the distortion correcting circuit 52 that does not include the distortion correction range calculating unit, the distortion correcting circuit of the related art including the distortion correction range calculating unit is referred to as a "distortion correcting circuit 53." The distortion correcting circuit 53 pre-obtains coordinates of four sides of the input image data before the distortion correction by carrying out the same distortion coordinate transformation calculation as that of the distortion correction coordinate transforming unit 522 along a range of output image data, for example, four sides of the block line 41. This is based on an idea that it is possible to avoid an error in the processing of the interpolation calculation because a range of input image data necessary for carrying out an interpolation calculation of all output image data is input image data existing within a pre-calculated range by pre-calculating a range (coordinates) of input image data necessary for generating output image data of the outermost periphery in a range in which the output image data is output.

In Japanese Unexamined Patent Application, First Publication No. 2005-45514, the number of unit lines of a front side and the number of unit lines of a rear side to be used when the interpolation calculation is carried out are decided by assuming that a skew (distortion) of one end of left and right ends within the four sides of the range of the input image data obtained is a maximum skew (distortion) to be generally considered. That is, a range (the number of unit lines) of input image data to be used in the interpolation calculation is decided based on input image data of any one end having a large distortion between the left and right ends of the block line 41. The number of unit lines of the front side and the number of unit lines of the rear side decided here are uniformly set as the number of unit lines to be used when the interpolation calculation of the block line 41 is carried out.

FIG. 11 is a diagram illustrating a method of obtaining the number of unit lines of a front side and the number of unit lines of a rear side to be used when an interpolation calculation is carried out in the distortion correcting circuit 53. FIG. 11 shows a position of input image data of any one end of left and right ends of a range of input image data obtained by the distortion correction range calculating unit. When the number of unit lines of the front side and the number of unit lines of the rear side to be used in the interpolation calculation are obtained, a position (coordinates) of input image data A (an upper end of an input image data line in FIG. 11) for which an interpolation is initially performed is first designated as the center.

Based on a difference between the position (coordinates) of the input image data A serving as the center on the line of the input image data and a position (coordinates) of input image data H maximally separated on the front side (the left side in FIG. 11), the number of unit lines of the front side including the input image data H previous to the input image data A serving as the center is designated as a post-unit line buffer (ULB). Based on a difference between the position (coordinates) of the input image data A serving as the center on the line of the input image data and a position (coordinates) of input image data C maximally separated on the rear side (the right side in FIG. 11), the number of unit lines of the rear side including the input image data C after the input image data A serving as the center is designated as a pre-ULB. As described above, the number of unit lines of the front side (the post-ULB) and the number of unit lines of the rear side (the pre-ULB) are respectively obtained for lines of the input image data of the left and right ends of the input image data range.

One larger post-ULB value (the number of unit lines) between a post-ULB value obtained from a line of the left end of the input image data range and a post-ULB value obtained from a line of the right end of the input image data range is designated as a final post-ULB. One larger pre-ULB value (the number of unit lines) between a pre-ULB value obtained from the line of the left end of the input image data range and a pre-ULB value obtained from the line of the right end of the input image data range is designated as a final pre-ULB. The post-ULB and the pre-ULB are uniformly set as the number of unit lines to be used when the interpolation calculation is carried out.

For example, the distortion correcting circuit 53 sets the post-ULB and pre-ULB in the memory control unit 524 of the distortion correcting circuit 52 of the related art shown in FIG. 9, and controls the line memory unit 523 based on coordinates of image data before a distortion correction transformed by the distortion correction coordinate transforming unit 522 and the set post-ULB and pre-ULB values. That is, the memory control unit 524 controls the number of lines stored in the line memory unit 523 so that the number of lines of input image data stored in the line memory unit 523 satisfies the set post-ULB and pre-ULB. Thereby, the distortion correcting circuit 53 disclosed in Patent Document 2 is configured to avoid an error in the processing of an interpolation calculation and efficiently carry out the interpolation calculation.

However, it is not always true that a skew (distortion) at a left end or a right end of four sides of an input image data range is maximized in a distortion shape of each line in an image captured by an optical system having a distortion aberration. FIG. 12 is a diagram schematically illustrating an example of a distortion shape of a line of an input image data range. For example, there is also the case where a skew (distortion) of a left-end line L or a right-end line R is not maximized and a skew (distortion) of a center line C is maximized as in the example shown in FIG. 12. For example, if the skew (distortion) of the center line C is greater than in the set post-ULB and pre-ULB, the processing of an interpolation calculation becomes erroneous, interpolation processing is re-executed after the number of lines of the input image data stored in the line memory unit 523 is greater than or equal to the necessary number of lines, and the interpolation processing is not efficiently performed.

In consideration of the above-described case, it is possible to set values having margins in the post-ULB and the pre-ULB even in the distortion correcting circuit 53 as disclosed in Japanese Unexamined Patent Application, First Publication No. 2005-45514. However, if the post-ULB and pre-ULB having the margins are set, line memory units of which the number is greater than the number of lines to be used in actual interpolation processing are used. The distortion correcting circuit 53 can set margins to be small as compared with the distortion correcting circuit 52 because the post-ULB and the pre-ULB are pre-set, but the efficiency of line memory use is degraded because it is difficult to optimize margin amounts. Because it is necessary to prepare many line memory units considering the margins, a circuit scale of the distortion correcting circuit is increased.

If the efficiency of line memory use is degraded, a phenomenon that each image process to be pipeline-processed in an image processing apparatus is stopped (stalled) easily occurs. If the pipeline processing is actually stalled, it is necessary to re-execute each image process to be pipeline-processed and the entire processing time of the image processing apparatus becomes long. Alternatively, the entire processing of the image processing apparatus may not be normally completed. As a method of preventing the pipeline processing from being stalled in the image processing apparatus, it is possible to prepare a line memory unit in each image process circuit. However, in this case, a circuit scale of the image processing apparatus is further increased.

SUMMARY

According to the present invention, it is possible to avoid an error occurring in the processing of an interpolation calculation according to a distortion shape of each line within a range of input image data and normally complete distortion correction processing.

An image processing apparatus may include a distortion correcting unit, the distortion correcting unit performing distortion correction processing on input image data to generate output image data, the input image data having a distortion aberration corresponding to a distortion aberration characteristic of an imaging optical system, the distortion correcting unit outputting the output image data after the distortion correction processing. The distortion correcting unit may include a distortion correction coordinate transforming unit that obtains coordinates indicating a position of the input image data corresponding to a position of the output image data, a range calculating unit that calculates a range of the input image data to be used in the distortion correction processing based on the coordinates of the input image data obtained by the distortion correction coordinate transforming unit, a correction information storage unit that stores the coordinates of the input image data obtained by the distortion correction coordinate transforming unit and information regarding the range of the input image data calculated by the range calculating unit, an input image data storage unit that temporarily stores part of the input image data, and an interpolation calculating unit that checks an amount of the input image data stored in the input image data storage unit based on the information regarding the range of the input image data, which has been stored in the correction information storage unit, after the information regarding the range of the input image data is stored in the correction information storage unit, the interpolation calculating unit generating the output image data by carrying out an interpolation calculation on the input image data stored in the input image data storage unit based on the coordinates of the input image data stored in the correction information storage unit when the amount of the input image data stored in the input image data storage unit is greater than or equal to an amount necessary for the interpolation calculation.

A predetermined amount of the output image data, which is arranged in one row in a row direction within the output image data distributed in a two-dimensional matrix to be distortion-corrected and output, may be designated as one line. A predetermined amount of the input image data, which is arranged in one row in the row direction within the input image data distributed in a two-dimensional matrix, may be designated as one unit line. A plurality of unit lines may be temporarily stored in the input image data storage unit. The interpolation calculating unit may generate the output image data of the line after the distortion correction processing, and the distortion correction processing may be performed based on the input image data included in the plurality of unit lines stored in the input image data storage unit.

The range calculating unit may designate the unit line including the coordinates of the input image data corresponding to the output image data for which the interpolation calculation is first carried out by the interpolation calculating unit within the output image data included in the line to be distortion-corrected and output as a base. The range calculating unit may calculate a first number of unit lines indicating the number of units maximally separated in a first direction perpendicular to the unit line serving as the base and a second number of unit lines indicating the number of unit lines maximally separated in a second direction reverse to the first direction as information regarding a range of the input image data, for the unit lines including the coordinates of the input image data corresponding to the output image data for which the interpolation calculation is subsequently carried out by the interpolation calculating unit.

The correction information storage unit may include a plurality of storage areas each of which stores the coordinates of the input image data obtained by the distortion correction coordinate transforming unit and the information regarding the range of the input image data calculated by the range calculating unit. The correction information storage unit may store the coordinates of the input image data and the information regarding the range of the input image data for each line.

The input image data storage unit may temporarily store the input image data of the plurality of unit lines for each unit line. The interpolation calculating unit may include a calculation control unit that checks the number of unit lines stored in the input image data storage unit based on the first number of unit lines and the second number of unit lines stored in the correction information storage unit, the calculation control unit controlling a start of the interpolation calculation based on a check result. The calculation control unit may start the interpolation calculation of the interpolation calculating unit after checking whether unit lines of which the number is greater than or equal to a sum of the first number of unit lines and the second number of unit lines are stored in the input image data storage unit. The interpolation calculating unit may generate each of the output image data included in the line by carrying out the interpolation calculation on the input image data of the plurality of unit lines stored in the input image data storage unit based on the coordinates of the input image data stored in the correction information storage unit.

The correction information storage unit may include a coordinate storage unit that stores the coordinates of the input image data obtained by the distortion correction coordinate transforming unit in correspondence with each output image data included in the line of the output image data, and a unit line count storage unit that stores the first number of unit lines and the second number of unit lines calculated by the range calculating unit. The coordinate storage unit may sequentially store the coordinates of the input image data for the output image data included in the line. The unit line count storage unit may store the first number of unit lines and the second number of unit lines in the line stored by the coordinate storage unit one by one.

The image processing apparatus may further include a line count check unit that checks the number of unit lines capable of being stored in the input image data storage unit based on the first number of unit lines and the second number of unit lines calculated by the range calculating unit. The line count check unit may store the first number of unit lines and the second number of unit lines in the correction information storage unit if the sum of the first number of unit lines and the second number of unit lines is less than or equal to the number of unit lines capable of being stored in the input image data storage unit. The line count check unit may output a signal indicating an error if the sum of the first number of unit lines and the second number of unit lines is greater than the number of unit lines capable of being stored in the input image data storage unit.

The distortion correction coordinate transforming unit may include an interpolation position generating unit that generates an interpolation position indicating a position of each output image data included in the line of the output image data. The distortion correction coordinate transforming unit may transform the interpolation position generated by the interpolation position generating unit into coordinates indicating a position of the input image data based on a transformation characteristic corresponding to a preset distortion aberration characteristic of the imaging optical system.

The distortion correction coordinate transforming unit may sequentially obtain the coordinates of the input image data when there is a storage area capable of storing the coordinates of the input image data in the correction information storage unit. The interpolation calculating unit may check the amount of the input image data stored in the input image data storage unit by reading the information regarding the range of the input image data from the correction information storage unit after the information regarding the range of the input image data is written to the correction information storage unit.

An image processing method may include a distortion correcting step of performing distortion correction processing on input image data to generate output image data, the distortion correction processing having a distortion aberration corresponding to a distortion aberration characteristic of an imaging optical system, the distortion correction processing outputting the output image data after distortion correction processing. The distortion correcting step may include a distortion correction coordinate transforming step of obtaining coordinates indicating a position of the input image data corresponding to a position of the output image data output by distortion correction processing, and storing the obtained coordinates of the input image data in a correction information storage unit, a range calculating step of calculating a range of the input image data to be used in the distortion correction processing based on the coordinates of the input image data obtained by the distortion correction coordinate transforming step, and storing information regarding the calculated range of the input image data in the correction information storage unit, and an interpolation calculating step of reading the information regarding the range of the input image data from the correction information storage unit after the information regarding the range of the input image data calculated by the range calculating step is stored in the correction information storage unit, checking an amount of the input image data stored in an input image data storage unit based on the read information regarding the range of the input image data, reading the coordinates of the input image data from the correction information storage unit when the amount of the input image data stored in the input image data storage unit is greater than or equal to an amount necessary for an interpolation calculation, and generating the output image data by carrying out the interpolation calculation on the input image data stored in the input image data storage unit based on the read coordinates of the input image data.

BRIEF DESCRIPTION OF THE DRAWINGS

The above features and advantages of the present invention will be more apparent from the following description of certain preferred embodiments taken in conjunction with the accompanying drawings, in which:

FIG. 7 is a diagram schematically illustrating an operation in which an aspect conversion circuit reads image data from a frame memory unit and outputs input image data to a distortion correcting circuit;

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

Figure 5:
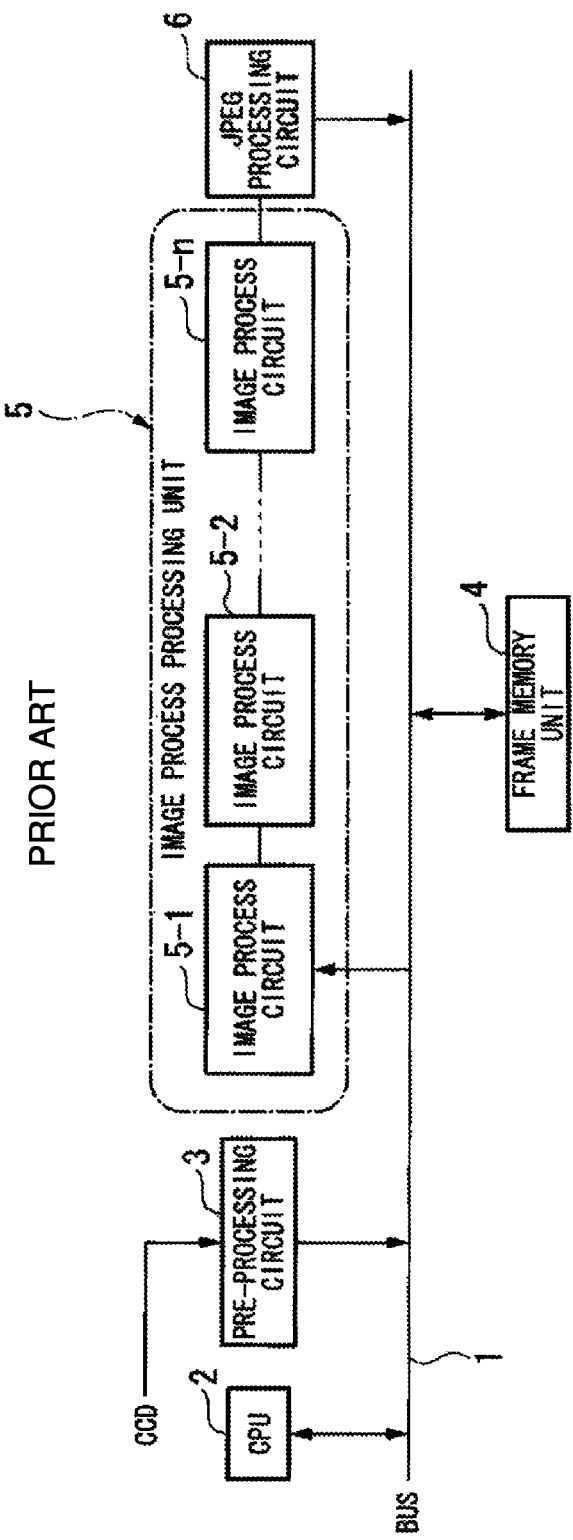
FIG. 5 is a block diagram illustrating a schematic configuration of an image processing apparatus in accordance with the related art.
Figure 6A:
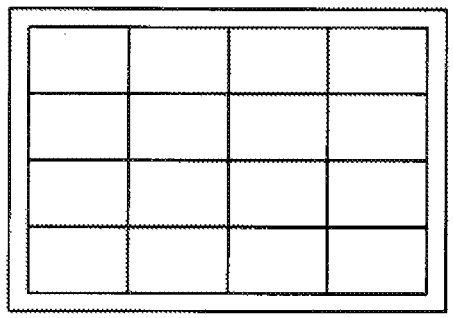
FIGS. 6A to 6C are diagrams illustrating examples of distortion aberrations of an optical system.
Figure 6B:
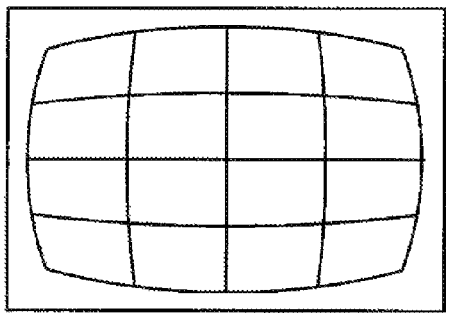
Figure 6C:
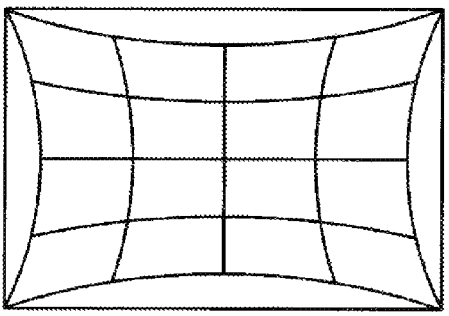
Figure 8A:
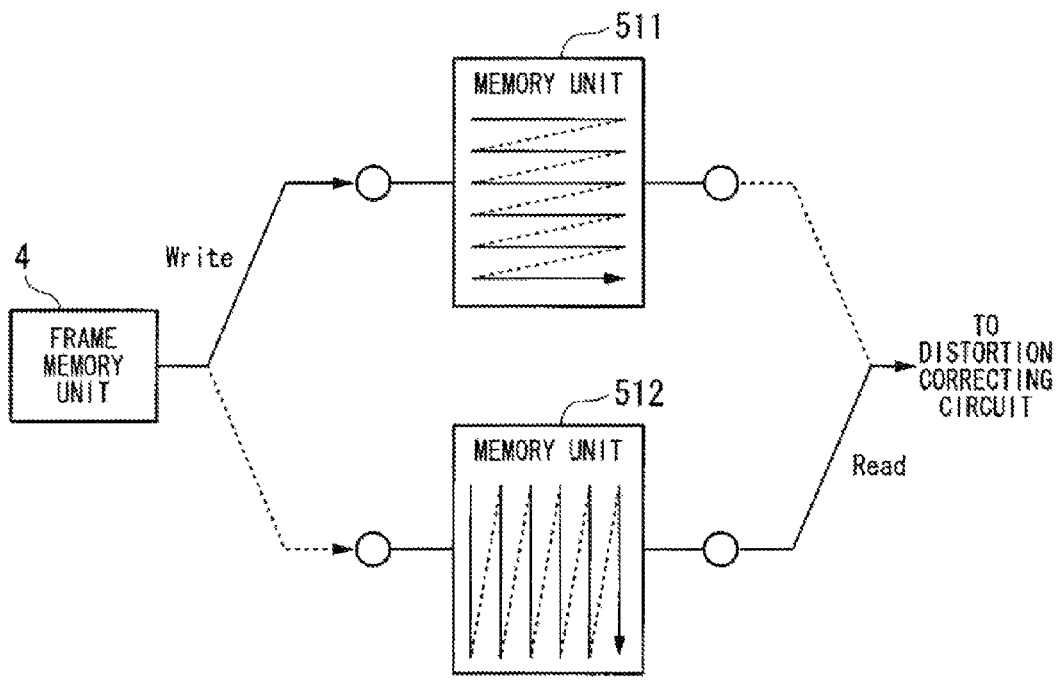
FIGS. 8A and 8B are diagrams illustrating a schematic configuration and a schematic operation of an aspect conversion circuit.
Figure 8B:
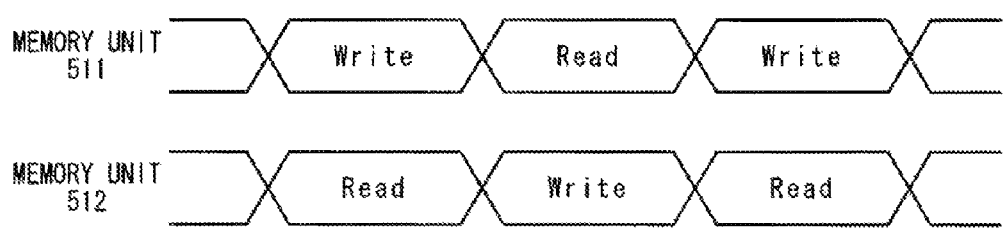

In an image processing apparatus in accordance with preferred embodiments of the present invention, a distortion correcting circuit included as an image process circuit within an image process processing unit 5, more specifically, the image process circuit 5-2, is different from that of the image processing apparatus in accordance with the related art shown in FIG. 5.

First Preferred Embodiment

Figure 1:
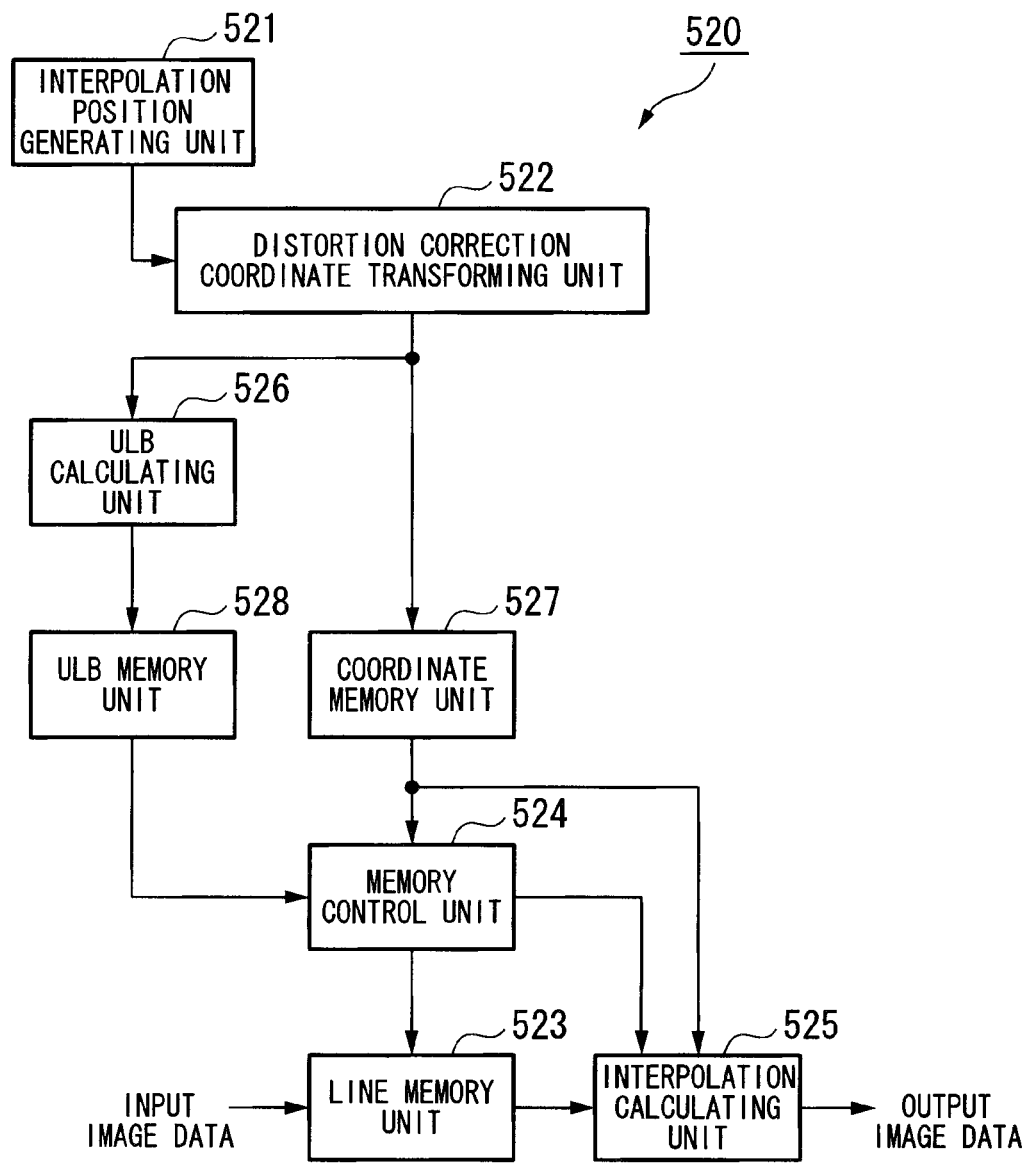
FIG. 1 is a block diagram illustrating a schematic configuration of a distortion correcting circuit in accordance with a first preferred embodiment of the present invention.

FIG. 1 is a block diagram illustrating a schematic configuration of a distortion correcting circuit in accordance with a first preferred embodiment of the present invention. A distortion correcting circuit 520 in accordance with the first preferred embodiment of the present invention shown in FIG. 1 is included as the image process circuit 5-2 within the image process processing unit 5 of the image processing apparatus of this embodiment. Input image data input from an aspect conversion circuit (the image process circuit 5-1), which is a preceding-stage image process circuit, is corrected, and output image data after the correction is output to a next-stage image process circuit. The distortion correcting circuit 520 performs processing as a unit that corrects one row (line) of the output image data.

Figure 9:
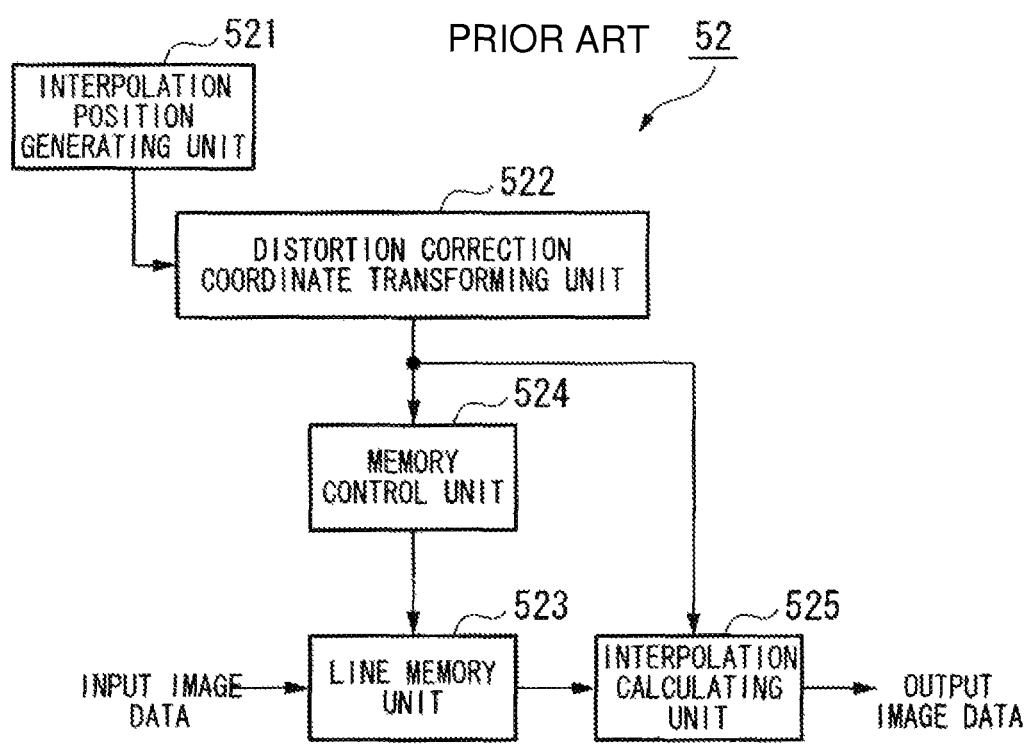
FIG. 9 is a block diagram illustrating a schematic configuration of a distortion correcting circuit in accordance with the related art.

The distortion correcting circuit 520 in accordance with the first preferred embodiment of the present invention as shown in FIG. 1 includes an interpolation position generating unit 521, a distortion correction coordinate transforming unit 522, a line memory unit 523, a memory control unit 524, a ULB calculating unit 526, a coordinate memory unit 527, a ULB memory unit 528, and an interpolation calculating unit 525. The distortion correcting circuit 520 in accordance with the first preferred embodiment of the present invention has a configuration in which the ULB calculating unit 526, the coordinate memory unit 527, and the ULB memory unit 528 are added to the distortion correcting circuit 52 in accordance with the related art shown in FIG. 9, and the operations of the other components are substantially the same as those of the distortion correcting circuit 52 in accordance with the related art shown in FIG. 9. Accordingly, the components of the distortion correcting circuit 520 that perform the same operations as those of the distortion correcting circuit 52 in accordance with the related art shown in FIG. 9 are denoted by the same reference numerals, and only operational differences will be described.

The interpolation position generating unit 521 sequentially generates an interpolation position indicating a position of output image data included in one line to be output after an interpolation.

The distortion correction coordinate transforming unit 522 sequentially transforms a position of input image data before a distortion correction into coordinates based on the interpolation position generated by the interpolation position generating unit 521. Also, the distortion correction coordinate transforming unit 522 sequentially outputs information regarding the coordinates indicating the position of input image data before the distortion correction into which the transformation is performed to the coordinate memory unit 527 and the ULB calculating unit 526.

The coordinate memory unit 527 is a memory unit that stores coordinate information for one line. The coordinate memory unit 527 sequentially stores coordinate information for one line indicating the position of input image data before the distortion correction input from the distortion correction coordinate transforming unit 522. For example, the coordinate memory unit 527 is constituted by a first in first output (FIFO) memory unit having a storage area for one line. Also, the coordinate memory unit 527 can be configured to have a storage area for a plurality of lines.

The ULB calculating unit 526 calculates the number of unit lines of a front side (a post-ULB) and the number of unit lines of a rear side (a pre-ULB) to be used when an interpolation calculation of output image data of one line is carried out based on the coordinate information for one line indicating the position of input image data before the distortion correction sequentially input from the distortion correction coordinate transforming unit 522. Also, the ULB calculating unit 526 outputs the calculated post-ULB and pre-ULB to the ULB memory unit 528.

The ULB memory unit 528 is a memory unit that stores the post-ULB and the pre-ULB, which are calculated by the ULB calculating unit 526 and used when the interpolation calculation of output image data of one line is carried out. The ULB memory unit 528 stores the post-ULB and the pre-ULB corresponding to the coordinate information for one line stored in the coordinate memory unit 527 one by one. For example, the ULB memory unit 528 is constituted by a FIFO memory unit having two storage areas. The storage areas of the ULB memory unit 528 correspond to the number of lines provided in the coordinate memory unit 527, and include areas capable of storing the post-ULB and the pre-ULB for the number of lines provided in the coordinate memory unit 527 if the coordinate memory unit 527 is configured to have storage areas for a plurality of lines. That is, it is a configuration having storage areas of which the number is obtained by multiplying the number of lines provided in the coordinate memory unit 527 by 2.

The memory control unit 524 checks the number of unit lines temporarily stored in the line memory unit 523 based on the post-ULB and the pre-ULB stored in the ULB memory unit 528. If input image data of the number of unit lines of the post-ULB and the pre-ULB to be used when the interpolation calculation is carried out is provided within the line memory unit 523, a control signal for starting the interpolation calculation is output to the interpolation calculating unit 525. If input image data of the number of unit lines of the post-ULB and the pre-ULB to be used when the interpolation calculation is carried out is not provided within the line memory unit 523, it waits to start the interpolation calculation by the interpolation calculating unit 525 until the input image data of the number of unit lines necessary for the line memory unit 523 is provided without outputting the control signal for starting the interpolation calculation. After the input image data of the number of unit lines necessary for the interpolation calculation is provided in the line memory unit 523, it causes the interpolation calculating unit 525 to start the interpolation calculation by outputting the control signal for starting the interpolation calculation.

The interpolation calculating unit 525 generates output image data by carrying out the interpolation calculation on the input image data stored in the line memory unit 523 in response to the control signal for starting the interpolation calculation input from the memory control unit 524. When the interpolation calculating unit 525 carries out the interpolation calculation, the coordinate information indicating the position of input image data before the distortion correction stored in the coordinate memory unit 527 is sequentially read and the interpolation calculation is carried out for the input image data stored in the line memory unit 523 based on the read coordinate information.

Next, the interpolation processing of the distortion correcting circuit 520 will be described. The distortion correcting circuit 520 performs the interpolation processing in the following procedures. In the following description, for example, an example in which one block line 41 is eight rows and eight columns will be described. For example, it is assumed that the number of lines of eight input image data (input image data A to H) shown in FIG. 11 corresponding to output image data to be output after an interpolation is 8. Each of the output image data, the interpolation position, and the input image data is expressed by XY coordinates indicating a position, a number subsequent to X is a row number, and a number subsequent to Y is a column number. For example, input image data corresponding to a second column and a third row is expressed by input image data (X3, Y2).

It is described that the coordinate memory unit 527 is configured to have a storage area that stores coordinate information for one unit line, that is, 8 rows, and the ULB memory unit 528 is configured to have storage areas that store the post-ULB and the pre-ULB one by one. The coordinate memory unit 527 and the ULB memory unit 528 are constituted, for example, by the FIFO memory unit, but it is described that the coordinate memory unit 527 and the ULB memory unit 528 are constituted, for example, by a static random access memory unit (SRAM), in order to facilitate the description in the following description.

The storage areas of the line memory unit 523 are connected in a ring shape, but storage areas (corresponding to the number of lines) in which input image data necessary for the interpolation calculation for at least one unit line can be simultaneously stored are provided.

If the distortion correcting circuit 520 starts the interpolation processing, it is as follows.

(Procedure 1):

The line memory unit 523 starts an operation of temporarily storing input image data for each unit line. The interpolation position generating unit 521 generates an interpolation position (X1, Y1) indicating a position of output image data (X1, Y1) of a first column included in a first row to be output after a first interpolation.

(Procedure 2):

The distortion correction coordinate transforming unit 522 obtains coordinates (X1, Y1) indicating the position of input image data (input image data A in the example shown in FIG. 11) before a distortion correction for an interpolation position (X1, Y1) generated by the interpolation position generating unit 521 based on a distortion correcting equation having a distortion aberration characteristic corresponding to a preset zoom position or the like of the optical system. Also, the distortion correction coordinate transforming unit 522 outputs information regarding the coordinates (X1, Y1) indicating the transformed input image data position to the coordinate memory unit 527 and the ULB calculating unit 526.

(Procedure 3):

The coordinate memory unit 527 stores the coordinates (X1, Y1) input from the distortion correction coordinate transforming unit 522 in a coordinate memory unit area (for example, a first storage area). The ULB calculating unit 526 designates the coordinates (X1, Y1) input from the distortion correction coordinate transforming unit 522 as coordinates of a base (center) for calculating the post-ULB (the number of unit lines) and the pre-ULB (the number of unit lines).

(Procedure 4):

The interpolation position generating unit 521 generates an interpolation position (X1, Y2) indicating a position of output image data (X1, Y2) of a second column included in the first row to be output after a second interpolation.

(Procedure 5):

The distortion correction coordinate transforming unit 522 obtains coordinates (X1, Y2) indicating a position of input image data (input image data B in the example shown in FIG. 11) before a distortion correction based on the interpolation position (X1, Y2) generated by the interpolation position generating unit 521, and outputs information regarding the obtained coordinates (X1, Y2) indicating the position of the input image data to the coordinate memory unit 527 and the ULB calculating unit 526.

(Procedure 6):

The coordinate memory unit 527 stores the coordinates (X1, Y2) input from the distortion correction coordinate transforming unit 522 in a coordinate memory unit area (for example, a second storage area). The ULB calculating unit 526 compares the coordinates (X1, Y2) input from the distortion correction coordinate transforming unit 522 with the center coordinates (X1, Y1), and calculates the post-ULB and the pre-ULB. Also, the ULB calculating unit 526 temporarily retains the calculated post-ULB value (the number of unit lines) and the calculated pre-ULB value (the number of unit lines).

(Procedure 7):

The interpolation position generating unit 521 generates an interpolation position (X1, Y3) indicating a position of output image data (X1, Y3) of a third column included in the first row to be output after a third interpolation.

(Procedure 8):

The distortion correction coordinate transforming unit 522 obtains coordinates (X1, Y3) indicating the position of input image data (input image data C in the example shown in FIG. 11) before a distortion correction based on an interpolation position (X1, Y3) generated by the interpolation position generating unit 521, and outputs information of the obtained coordinates (X1, Y3) indicating the position of the input image data to the coordinate memory unit 527 and the ULB calculating unit 526.

(Procedure 9):

The coordinate memory unit 527 stores the coordinates (X1, Y3) input from the distortion correction coordinate transforming unit 522 in a coordinate memory unit area (for example, a third storage area). The ULB calculating unit 526 compares the coordinates (X1, Y3) input from the distortion correction coordinate transforming unit 522 with the center coordinates (X1, Y1), and calculates the post-ULB and the pre-ULB. Also, the ULB calculating unit 526 compares the calculated post-ULB and pre-ULB values with the temporarily retained post-ULB and pre-ULB values, updates a larger value (the number of unit lines) as each of the post-ULB and the pre-ULB, and temporarily retains an updated post-ULB value (the number of unit lines) and an updated pre-ULB (the number of unit lines).

(Procedure 10):

After procedures 4 to 6 are iterated and processing is completed for output image data (X1, Y7) of a seventh column included in the first row, the interpolation position generating unit 521 generates an interpolation position (X1, Y8) indicating a position of output image data (X1, Y8) of an eighth column included in the first row to be output after a final (eighth) interpolation.

(Procedure 11):

The distortion correction coordinate transforming unit 522 obtains coordinates (X1, Y8) indicating a position of input image data (input image data H in the example shown in FIG. 11) before a distortion correction based on the interpolation position (X1, Y8) generated by the interpolation position generating unit 521, and outputs information regarding the obtained coordinates (X1, Y8) indicating the position of the input image data to the coordinate memory unit 527 and the ULB calculating unit 526.

(Procedure 12):

The coordinate memory unit 527 stores the coordinates (X1, Y8) input from the distortion correction coordinate transforming unit 522 in a coordinate memory unit area (for example, an eighth storage area). The ULB calculating unit 526 compares the coordinates (X1, Y8) input from the distortion correction coordinate transforming unit 522 with the center coordinates (X1, Y1), and calculates the post-ULB and the pre-ULB. Also, the ULB calculating unit 526 respectively compares the calculated post-ULB and pre-ULB values with the temporarily retained post-ULB and pre-ULB values, updates any one larger value (the number of unit lines) as each of the post-ULB and the pre-ULB, and temporarily retains an updated post-ULB value (the number of unit lines) and an updated pre-ULB (the number of unit lines) in the ULB memory unit 528.

Figure 11:
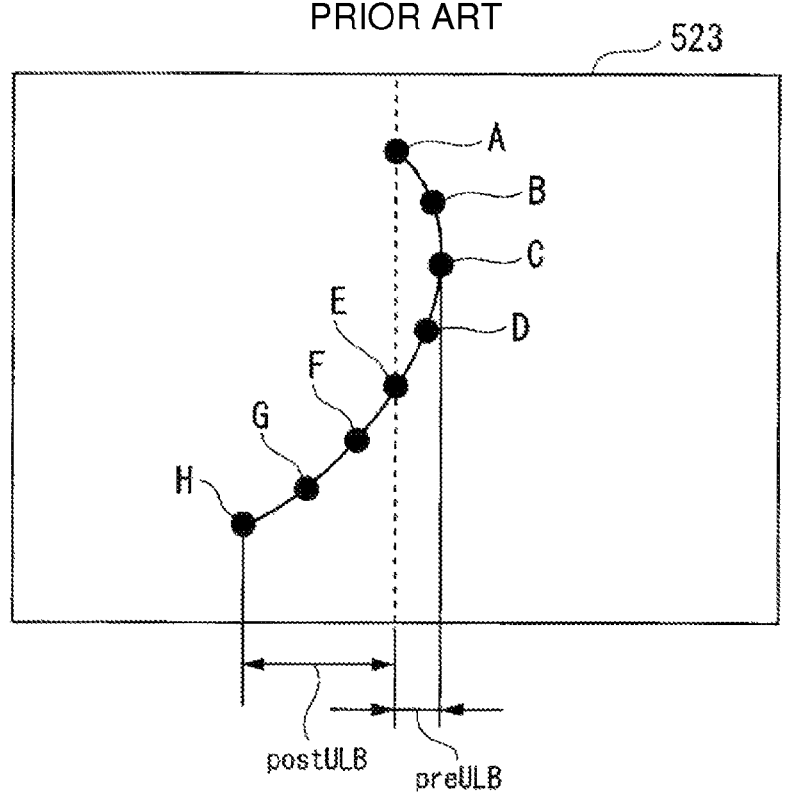
FIG. 11 is a diagram illustrating a method of obtaining the number of unit lines of a front side and the number of unit lines of a rear side to be used when an interpolation calculation is carried out in the distortion correcting circuit.
Figure 12:
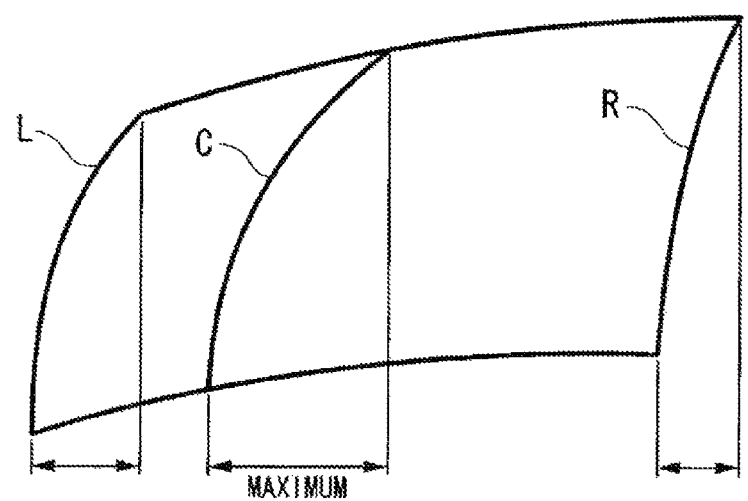
FIG. 12 is a diagram schematically illustrating an example of a distortion shape of a line of an input image data range.

As described above, the coordinates indicating a position of each input image data of a unit line in the first row and the post-ULB and pre-ULB values of the unit line in the first row as shown in FIG. 11 are obtained.

(Procedure 13):

If the post-ULB and the pre-ULB are stored in the ULB memory unit 528, the memory control unit 524 checks the number of unit lines temporarily stored in the line memory unit 523 based on the post-ULB and the pre-ULB stored in the ULB memory unit 528. If input image data of the number of unit lines of the post-ULB and the pre-ULB is provided within the line memory unit 523, the memory control unit 524 outputs a control signal for starting the interpolation calculation to the interpolation calculating unit 525. If input image data of the number of unit lines of the post-ULB and the pre-ULB is not provided within the line memory unit 523, the memory control unit 524 iteratively checks the number of unit lines temporarily stored in the line memory unit 523 until the input image data of the number of unit lines necessary for the line memory unit 523 is provided. After input image data of the number of unit lines necessary for the interpolation calculation is provided in the line memory unit 523, the memory control unit 524 outputs the control signal for starting the interpolation calculation to the interpolation calculating unit 525.

(Procedure 14):

The interpolation calculating unit 525 generates output image data by carrying out the interpolation calculation on the input image data stored in the line memory unit 523 if the control signal for starting the interpolation calculation is input from the memory control unit 524. At this time, the interpolation calculating unit 525 subsequently reads information of coordinates indicating a position of input image data before a distortion correction stored in the coordinate memory unit 527, and sequentially carries out the interpolation calculation on the input image data stored in the line memory unit 523 based on the read coordinate information.

(Procedure 15):

If the interpolation calculation is started by the interpolation calculating unit 525 and information regarding coordinates indicating a position of input image data before a distortion correction stored in the coordinate memory unit 527 (here, information regarding coordinates stored in a first coordinate memory unit area) is read, the interpolation position generating unit 521 checks that there is an empty storage area in the coordinate memory unit 527. Also, the interpolation position generating unit 521 generates an interpolation position (X2, Y1) indicating a position of output image data (X2, Y1) of a first column included in a second row to be output after a first interpolation of the next row. Thereafter, as in procedures 2 to 14, information regarding coordinates stored in the coordinate memory unit 527 is read and the interpolation calculation is carried out. That is, every time an empty storage area in the coordinate memory unit 527 is checked, the generation of an interpolation position, the transformation into coordinates indicating a position of input image data before a distortion correction, the storage to the coordinate memory unit 527 (the update of coordinate information), the calculation of a post-ULB and a pre-ULB, the checking of the number of unit lines temporarily stored in the line memory unit 523, and the generation of output image data subjected to the interpolation calculation are iterated. When output image data of a final column (eighth column) of a final row (eighth row) is completely generated, the interpolation processing is completed.

As described above, the distortion correcting circuit 520 in accordance with the first preferred embodiment of the present invention can calculate the post-ULB and the pre-ULB for each row (line) of output image data to be output after the interpolation. Based on the calculated post-ULB and pre-ULB, it is possible to check whether or not input image data of the number of unit lines to be used when the interpolation calculation is carried out is provided. After input image data of the number of unit lines necessary for the line memory unit 523 is provided, it is possible to start the interpolation calculation. That is, when the interpolation calculating unit 525 starts the interpolation calculation, post-ULB and pre-ULB values of a row (line) of output image data to be output after the interpolation are all stored in the ULB memory unit 528. Thereby, even when the number of unit lines to be used when the interpolation calculation is carried out for each line to be output after the interpolation differs according to each row (line) of output image data to be output after the interpolation, it is possible to carry out the interpolation calculation using input image data of the optimum number of unit lines. As described above, because the distortion correcting circuit 520 in accordance with the first preferred embodiment of the present invention calculates the number of unit lines to be used when the interpolation calculation is carried out for each row (line) of output image data to be output after the interpolation and carries out the interpolation calculation after input image data of the necessary number of unit lines is provided, it is possible to avoid an error in the processing of an interpolation calculation and efficiently complete the interpolation calculation.

Because the distortion correcting circuit 520 in accordance with the first preferred embodiment of the present invention does not need to cause the number of lines of input image data stored in the line memory unit 523 to have a margin, it is possible to improve the use efficiency of the line memory unit 523. Thereby, the image processing apparatus of this embodiment can reduce a ratio at which pipeline processing is stalled in the image processing apparatus of this embodiment, and obtain the effect of shortening the entire processing time of the image processing apparatus. It is possible to avoid an unnecessary increase in circuit scale.

In the above-described interpolation processing procedure, a configuration in which the coordinate memory unit 527 has a storage area that stores information of coordinates for one line, and the ULB memory unit 528 has storage areas that each store the post-ULB and the pre-ULB one by one has been described.

An example in which the processing of a second row is started after the interpolation calculation is started by the interpolation calculating unit 525 in procedure 15 has been described. However, as described above, storage areas for a plurality of lines can be provided in the coordinate memory unit 527, and the ULB memory unit 528 can include areas capable of storing a post-ULB and a pre-ULB for the number of lines provided in the coordinate memory unit 527. In this case, it is possible to start the processing of a second row in parallel with procedure 13 continuously after post-ULB and pre-ULB values of a first row are stored in procedure 12 without starting the processing of the second row after the interpolation calculation is started by the interpolation calculating unit 525 in procedure 15. As in procedure 15, confirmation of whether or not there is an empty storage area in the coordinate memory unit 527 is only performed when all storage areas for the plurality of lines provided in the coordinate memory unit 527 have been used.

Second Preferred Embodiment

Figure 2:
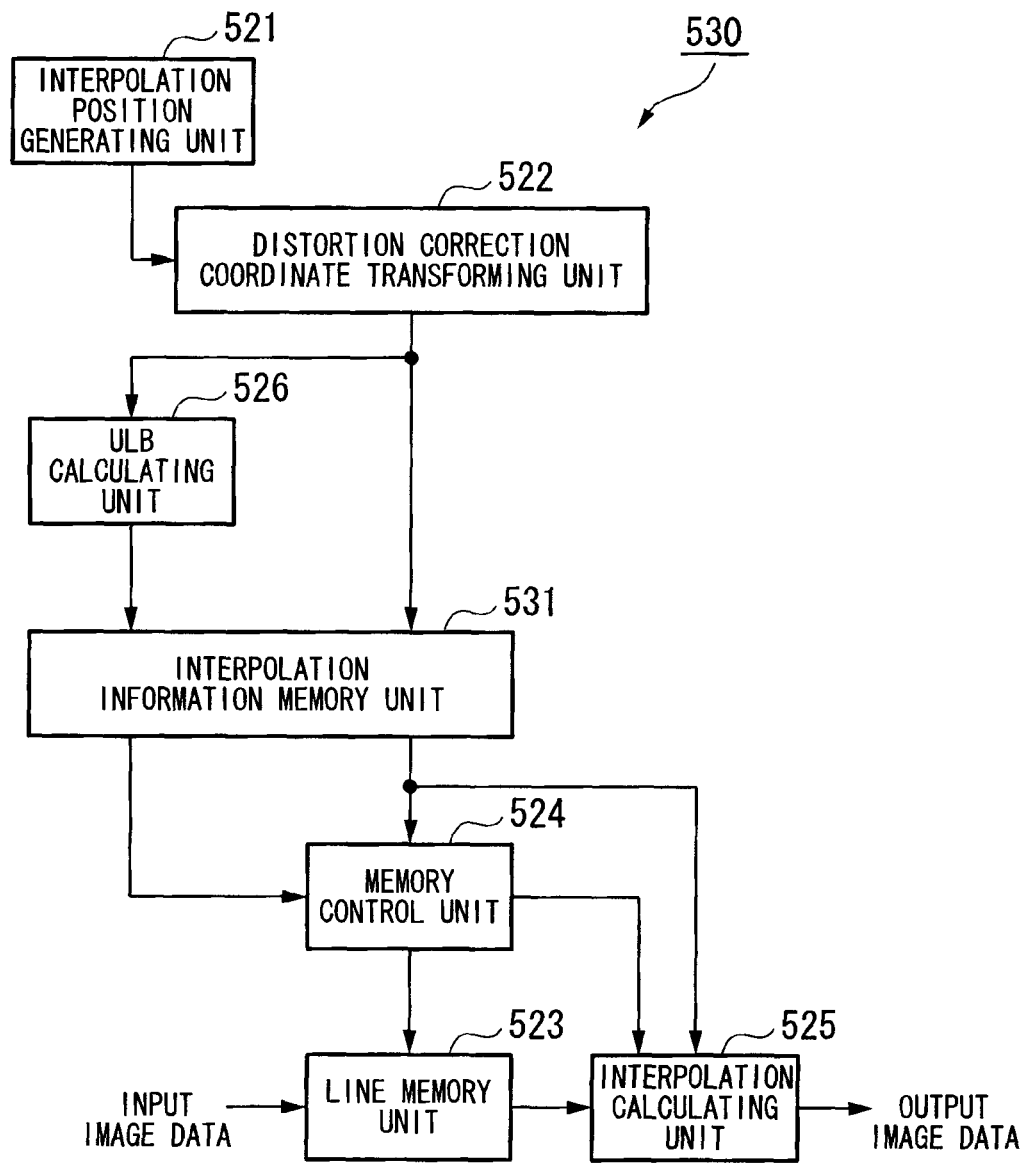
FIG. 2 is a block diagram illustrating a schematic configuration of the distortion correcting circuit in accordance with a second preferred embodiment of the present invention.

Next, a configuration of the distortion correcting circuit provided as the image process circuit 5-2 in the image processing apparatus in accordance with a second preferred embodiment of the present invention will be described. FIG. 2 is a block diagram illustrating a schematic configuration of the distortion correcting circuit in accordance with the second preferred embodiment of the present invention. In place of the distortion correcting circuit 520 shown in FIG. 1, a distortion correcting circuit 530 in accordance with the second preferred embodiment of the present invention shown in FIG. 2 is included as the image process circuit 5-2 within the image process processing unit 5 in the image processing apparatus of this embodiment. As in the distortion correcting circuit 520 shown in FIG. 1, input image data input from an aspect conversion circuit (the image process circuit 5-1), which is a preceding-stage image process circuit, is corrected, and output image data after correction is output to a next-stage image process circuit. Like the distortion correcting circuit 520 shown in FIG. 1, the distortion correcting circuit 530 performs processing as a unit that corrects one row (line) of output image data.

The distortion correcting circuit 530 in accordance with the second preferred embodiment of the present invention as shown in FIG. 2 includes an interpolation position generating unit 521, a distortion correction coordinate transforming unit 522, a line memory unit 523, a memory control unit 524, a ULB calculating unit 526, an interpolation information memory unit 531, and an interpolation calculating unit 525. The coordinate memory unit 527 and the ULB memory unit 528 within the distortion correcting circuit 520 shown in FIG. 1 are constituted by one interpolation information memory unit 531 in the distortion correcting circuit 530 in accordance with the second preferred embodiment of the present invention. The operations of the other components are substantially the same as those of the distortion correcting circuit 520 shown in FIG. 1. Accordingly, the components of the distortion correcting circuit 530 that perform the same operations as those of the distortion correcting circuit 520 shown in FIG. 1 are denoted by the same reference numerals and only operational differences will be described.

The distortion correction coordinate transforming unit 522 sequentially performs the transformation into coordinates indicating a position of input image data before a distortion correction based on an interpolation position generated by the interpolation position generating unit 521, and sequentially outputs information regarding the transformation coordinates indicating the position of the input image data before the distortion correction into which the transformation is performed to the interpolation information memory unit 531 and the ULB calculating unit 526.

Based on the coordinate information for one line indicating the position of input image data before the distortion correction sequentially input from the distortion correction coordinate transforming unit 522, the ULB calculating unit 526 calculates a post-ULB and a pre-ULB to be used when an interpolation calculation of output image data of one line is carried out, and outputs the calculated post-ULB and pre-ULB to the interpolation information memory unit 531.

The interpolation information memory unit 531 is a memory unit that stores information regarding coordinates for one line and a post-ULB and a pre-ULB corresponding to the coordinate information for the one line as interpolation information. Like the coordinate memory unit 527 shown in FIG. 1, the interpolation information memory unit 531 sequentially stores the coordinate information for one line indicating the position of input image data before the distortion correction input from the distortion correction coordinate transforming unit 522. Like the ULB memory unit 528 shown in FIG. 1, the interpolation information memory unit 531 stores a post-ULB and a pre-ULB corresponding to information regarding coordinates for one line one by one. The interpolation information memory unit 531 has a storage area capable of storing information regarding coordinates for one line and a post-ULB and a pre-ULB corresponding to the coordinate information for the one line as one set, and, for example, is constituted by SRAM. Also, the interpolation information memory unit 531 can be configured to have storage areas for a plurality of lines, that is, a plurality of sets.

The memory control unit 524 checks the number of unit lines temporarily stored in the line memory unit 523 based on the post-ULB and the pre-ULB stored in the interpolation information memory unit 531. The start of the interpolation calculation by the interpolation calculating unit 525 is controlled according to whether or not input image data of the number of unit lines of the post-ULB and the pre-ULB to be used when the interpolation calculation is carried out is provided within the line memory unit 523.

The interpolation calculating unit 525 generates output image data by carrying out the interpolation calculation in response to the control signal for starting the interpolation calculation input from the memory control unit 524. When the interpolation calculating unit 525 carries out the interpolation calculation, information regarding coordinates indicating a position of input image data before a distortion correction stored in the interpolation information memory unit 531 is sequentially read and the interpolation calculation is carried out for the input image data stored in the line memory unit 523 based on the read coordinate information.

Figure 3:
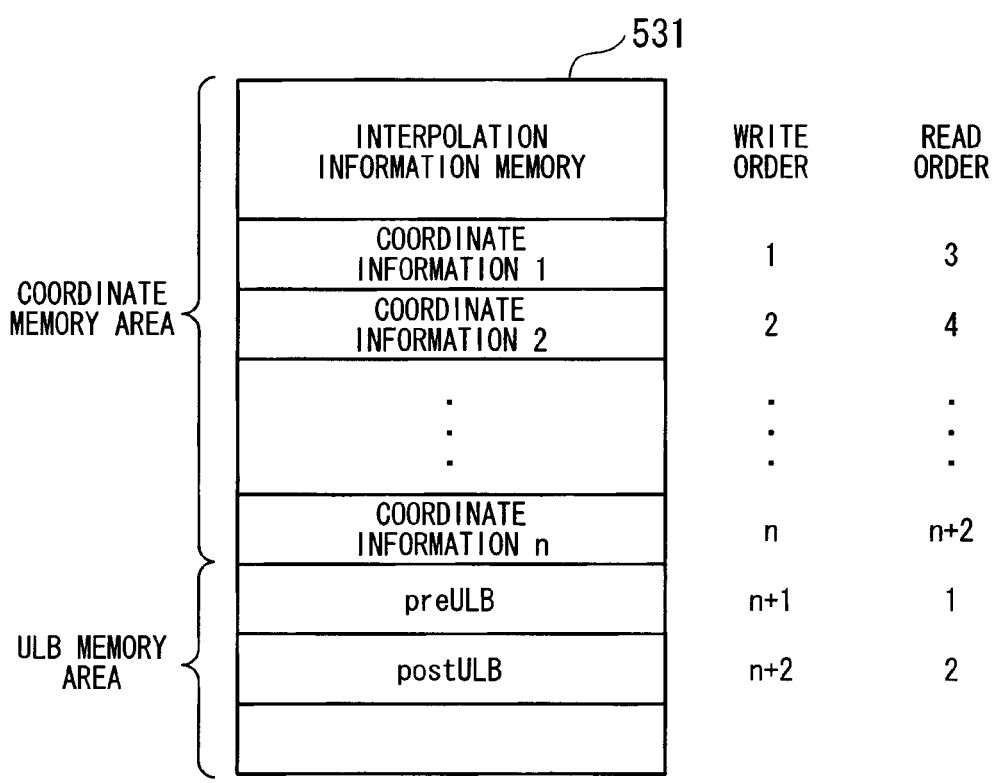
FIG. 3 is a diagram illustrating an example of a memory unit configuration of an interpolation information memory unit included in the distortion correcting circuit in accordance with the second preferred embodiment of the present invention.

Here, a write order and a read order of interpolation information (information of coordinates for one line and post-ULB and pre-ULB values corresponding to the information of the coordinates for the one line) in the interpolation information memory unit 531, which is different between the distortion correcting circuit 530 in accordance with the second preferred embodiment of the present invention and the distortion correcting circuit 520 in accordance with the first preferred embodiment of the present invention shown in FIG. 1, will be described. FIG. 3 is a diagram illustrating an example of a memory unit configuration of the interpolation information memory unit 531 included in the distortion correcting circuit 530 in accordance with the second preferred embodiment of the present invention. FIG. 3 shows an example of the interpolation information memory unit 531 including a storage area capable of storing interpolation information for one line.

As shown in FIG. 3, the interpolation information memory unit 531 includes a coordinate memory unit area where coordinate information is stored and a ULB memory unit area where a post-ULB and a pre-ULB corresponding to the coordinate information are stored.

If interpolation information is written to the interpolation information memory unit 531, the coordinate information for one line indicating the position of input image data before the distortion correction input from the distortion correction coordinate transforming unit 522 is first sequentially written (stored) from a first storage area within a coordinate memory unit area. After information regarding coordinates for one line is completely written, the post-ULB and the pre-ULB input from the ULB calculating unit 526 are written (stored). In FIG. 3, information of coordinates for one line is sequentially written in order of line orders 1 to n. Thereafter, the case where a pre-ULB is written in n+1 and a post-ULB is written in n+2 is shown.

If interpolation information is read from the interpolation information memory unit 531, the post-ULB and the pre-ULB are first read to the memory control unit 524. When the interpolation calculating unit 525 starts the interpolation calculation, coordinate information for one line is sequentially read from the first storage area of the coordinate memory unit area. In FIG. 3, the pre-ULB is read to the memory control unit 524 in a read order 1 and the post-ULB is read to the memory control unit 524 in a read order 2. Thereafter, the case where coordinate information for one line is sequentially read to the interpolation calculating unit 525 in read orders 3 to n+2 is shown.

As described above, the distortion correcting circuit 530 in accordance with the second preferred embodiment of the present invention has a difference in that the coordinate memory unit 527 and the ULB memory unit 528 within the distortion correcting circuit 520 in accordance with the first preferred embodiment of the present invention shown in FIG. 1 are replaced by one interpolation information memory unit 531 and hence writing and reading methods for the interpolation information memory unit 531 are different, but can obtain the same effect as the distortion correcting circuit 520 in accordance with the first preferred embodiment of the present invention shown in FIG. 1. Because only the writing and reading methods for the interpolation information memory unit 531 are different and the interpolation processing of the distortion correcting circuit 530 in accordance with the second preferred embodiment of the present invention is the same as that of the distortion correcting circuit 520 in accordance with the first preferred embodiment of the present invention shown in FIG. 1, detailed description is omitted.

Third Preferred Embodiment

Figure 4:
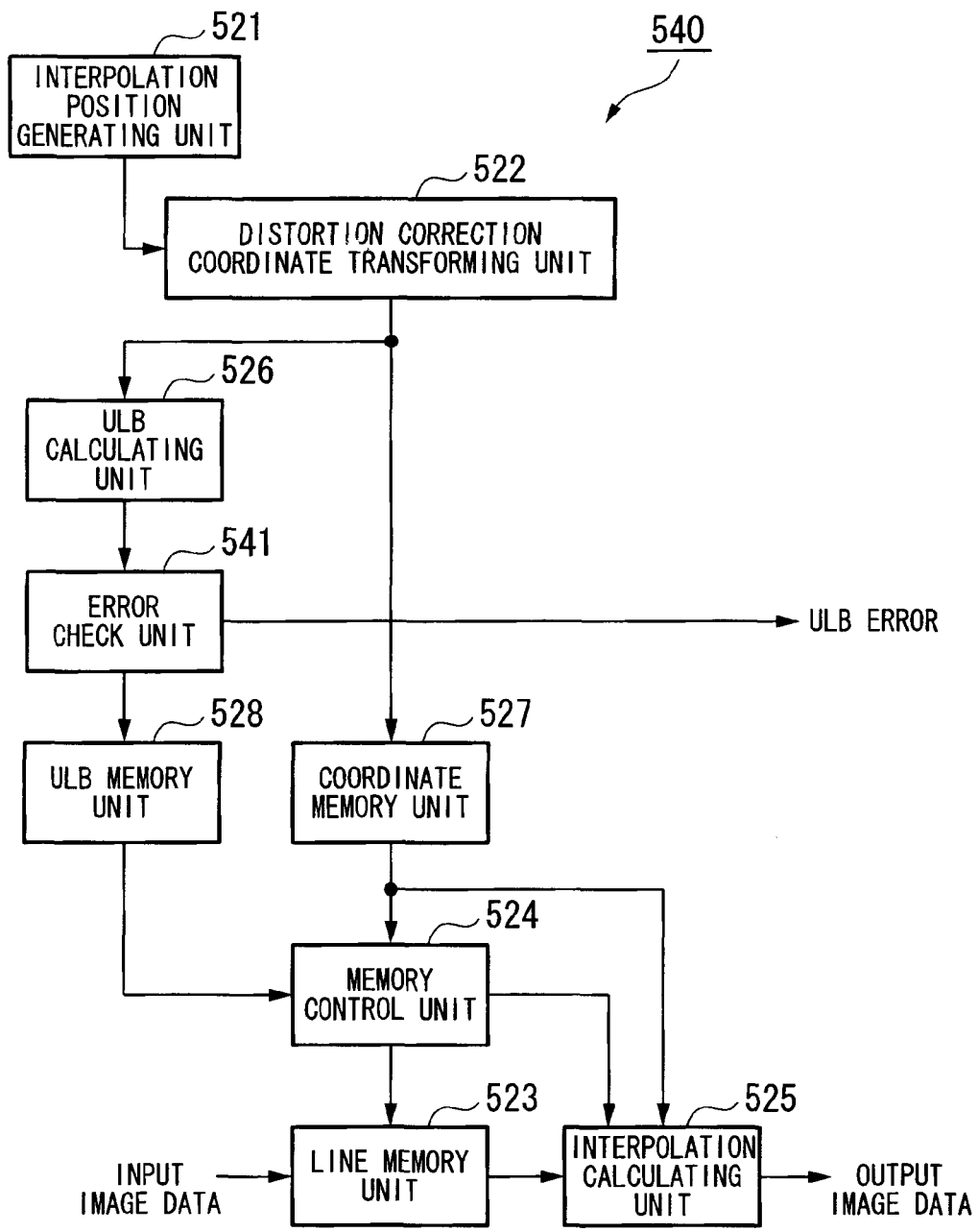
FIG. 4 is a block diagram illustrating a schematic configuration of a distortion correcting circuit in accordance with the third preferred embodiment of the present invention.

Next, a configuration of the distortion correcting circuit included as the image process circuit 5-2 in the image processing apparatus in accordance with a third preferred embodiment of the present invention will be described. FIG. 4 is a block diagram illustrating a schematic configuration of a distortion correcting circuit in accordance with the third preferred embodiment of the present invention. In place of the distortion correcting circuit 520 shown in FIG. 1 or the distortion correcting circuit 530 shown in FIG. 2, a distortion correcting circuit 540 in accordance with the third preferred embodiment of the present invention shown in FIG. 4 is included as the image process circuit 5-2 within the image process processing unit 5 in the image processing apparatus of this embodiment. As in the distortion correcting circuit 520 shown in FIG. 1 and the distortion correcting circuit 530 shown in FIG. 2, input image data input from an aspect conversion circuit (the image process circuit 5-1), which is a preceding-stage image process circuit, is corrected, and output image data after correction is output to a next-stage image process circuit. Like the distortion correcting circuit 520 shown in FIG. 1 and the distortion correcting circuit 530 shown in FIG. 2, the distortion correcting circuit 540 performs processing as a unit that corrects one row (line) of output image data.

The distortion correcting circuit 540 in accordance with the third preferred embodiment of the present invention as shown in FIG. 4 includes an interpolation position generating unit 521, a distortion correction coordinate transforming unit 522, a line memory unit 523, a memory control unit 524, a ULB calculating unit 526, an error check unit 541, a coordinate memory unit 527, a ULB memory unit 528, and an interpolation calculating unit 525. The distortion correcting circuit 540 in accordance with the third preferred embodiment of the present invention is a configuration in which the error check unit 541 is added to the distortion correcting circuit 520 shown in FIG. 1. The operations of the other components are substantially the same as those of the distortion correcting circuit 520 shown in FIG. 1. Accordingly, the components of the distortion correcting circuit 540 that perform the same operations as those of the distortion correcting circuit 520 shown in FIG. 1 are denoted by the same reference numerals and only operational differences will be described.

Figure 10:
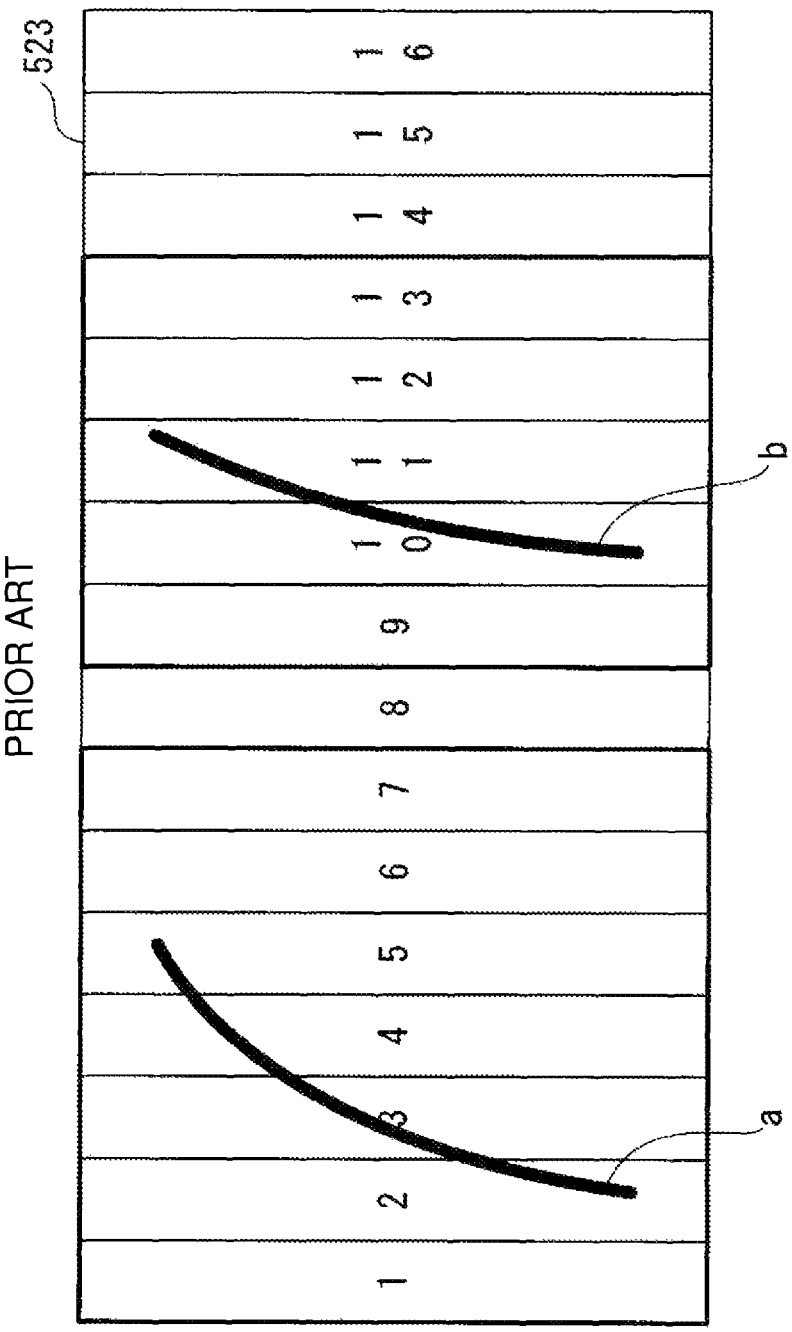
FIG. 10 is a diagram schematically illustrating an example of the line memory unit provided in the distortion correcting circuit and input image data stored in the line memory unit in accordance with the related art.

As described above, the number of lines of input image data before a distortion correction corresponding to output image data to be output after the interpolation differs according to each line from which the output image data is output (see FIG. 10). The number of unit lines of input image data capable of being stored in the line memory unit 523 included in the distortion correcting circuit is the predetermined number of lines. Accordingly, even when a post-ULB and a pre-ULB are pre-obtained as in the distortion correcting circuit 520 shown in FIG. 1 or the distortion correcting circuit 530 shown in FIG. 2, it is not possible to perform the processing of an interpolation calculation exceeding the number of unit lines of input image data capable of being stored in the line memory unit 523. That is, if input image data of the number of lines necessary for generating output image data is not stored in the line memory unit 523, the processing of an interpolation calculation for one line by the interpolation calculating unit 525 becomes erroneous without being normally completed. The distortion correcting circuit 540 in accordance with the third preferred embodiment of the present invention includes a structure for avoiding an error in the processing of the interpolation calculation based on the pre-obtained post-ULB and pre-ULB.

The ULB calculating unit 526 calculates a post-ULB and a pre-ULB to be used when an interpolation calculation of output image data of one line is carried out based on coordinate information for one line indicating a position of input image data before a distortion correction sequentially input from the distortion correction coordinate transforming unit 522, and outputs the calculated post-ULB and pre-ULB to the error check unit 541.

The ULB memory unit 528 stores the post-ULB and the pre-ULB input from the error check unit 541.

Based on the post-ULB and the pre-ULB calculated by the ULB calculating unit 526, the error check unit 541 determines whether or not the number of unit lines of input image data capable of being stored by the line memory unit 523 included within the distortion correcting circuit 540 exceeds the number of lines necessary for carrying out the interpolation calculation of output image data of one line. If it does not exceed the number of lines necessary for carrying out the interpolation calculation of output image data of one line, that is, if it is possible to store input image data of the number of lines necessary for the interpolation calculation within the line memory unit 523, the post-ULB and the pre-ULB calculated by the ULB calculating unit 526 are output to the ULB memory unit 528. If it exceeds the number of lines necessary for carrying out the interpolation calculation of output image data of one line, that is, if it is not possible to store input image data of the number of lines necessary for the interpolation calculation within the line memory unit 523, a ULB error signal indicating that the processing of the interpolation calculation becomes erroneous is output, for example, to the CPU 2, which is the entire control unit in the image processing apparatus of this embodiment.

The CPU 2 stops the interpolation processing in the distortion correcting circuit 540 in response to the ULB error signal input from the error check unit 541. The CPU 2 restarts the interpolation processing by the distortion correcting circuit 540 after changing various settings of the image processing apparatus of this embodiment so that the number of lines of input image data necessary for carrying out the interpolation calculation of output image data of one line is less than the number of unit lines of input image data capable of being stored by the line memory unit 523 included within the distortion correcting circuit 540.

As settings changed by the CPU 2, for example, it is possible to decrease the amount of input image data included in a unit line, that is, a width of the predetermined number of columns as the block line 41. This is because the number of lines of input image data necessary for carrying out the interpolation calculation of output image data of one line having a small width is decreased by decreasing the width of the block line 41. As described above, input image data of first to seventh unit lines is necessary if output image data of one line is generated based on input image data shown in the line a in the more specific example described with reference to FIG. 10. Here, if output image data of one line is generated, for example, based on a lower-side half of input image data shown in the line a, by decreasing the width of the block line 41, the output image data of the one line can be generated as long as there is input image data of first to fifth unit lines. As described above, the number of lines of input image data necessary for carrying out the interpolation calculation of output image data of one line is decreased.

For example, if the distortion of each line is small, it is possible to decrease the number of block lines 41 into which one-screen image data is divided by increasing the width of the predetermined number of columns as the block line 41 so that the interpolation calculation of output image data of one line is set to be carried out using all a number of lines of the line memory unit 523 included within the distortion correcting circuit 540, and it is possible to shorten the processing time of the interpolation processing by the distortion correcting circuit 540.

The distortion correcting circuit 540 in accordance with the third preferred embodiment of the present invention as described above can obtain the same effect as the distortion correcting circuit 520 in accordance with the first preferred embodiment of the present invention shown in FIG. 1, pre-avoid an error in the processing of an interpolation calculation due to a capacity of the line memory unit 523 included within the distortion correcting circuit 540, and efficiently complete the interpolation calculation.

According to the preferred embodiments of the present invention as described above, it is possible to calculate a post-ULB and a pre-ULB for each row (line) of output image data to be output after the interpolation, and check whether or not input image data of the number of unit lines to be used when the interpolation calculation is carried out is provided within the line memory unit. It is possible to start the interpolation calculation after input image data of the number of unit lines necessary for the line memory unit is provided. Thereby, even when the number of unit lines to be used when the interpolation calculation is carried out for each row (line) to be output after the interpolation differs according to each line of output image data to be output after the interpolation, it is possible to carry out the interpolation calculation using input image data of the optimum number of unit lines, avoid an error in the processing of an interpolation calculation, and efficiently complete the interpolation calculation.

According to the preferred embodiments of the present invention, it is possible to improve the use efficiency of the line memory unit included in the distortion correcting circuit, reduce a ratio at which pipeline processing is stalled in the image processing apparatus, and obtain the effect of shortening the entire processing time of the image processing apparatus. It is possible to avoid an unnecessary increase in a circuit scale of the distortion correcting circuit.

In the preferred embodiments of the present invention, it is possible to include a distortion correction range calculating unit. By such a configuration, it is possible to pre-recognize the width of the predetermined number of columns as one line of output image data in which no ULB error occurs, that is, the block line 41, before the interpolation processing is performed by the distortion correcting circuit of the embodiment of the present invention. More specifically, for example, in the distortion correcting circuit 540 in accordance with the third preferred embodiment of the present invention, the error check unit 541 determines whether or not the number of lines of input image data capable of being stored by the line memory unit 523 exceeds the necessary number of lines necessary for carrying out the interpolation calculation of output image data of one line based on a post-ULB and a pre-ULB calculated by the ULB calculating unit 526 after the interpolation processing is started. That is, a ULB error is determined after the interpolation processing is started. Thus, when the error occurs, the interpolation processing is restarted by the distortion correcting circuit 540 after the width of the predetermined number of columns as the block line 41 is changed.

If the distortion correction range calculating unit is further included, it is possible to pre-recognize the number of lines necessary for carrying out an interpolation calculation of output image data of one line. There is a possibility that a post-ULB and a pre-ULB calculated by the distortion correction range calculating unit are not maximum values in the block line 41, but it is possible to reduce a frequency of occurrence of a ULB error. Accordingly, the distortion correction range calculating unit can pre-avoid an error in the processing of an interpolation calculation. It is possible to more efficiently complete the interpolation calculation.

While preferred embodiments of the present invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. An image processing apparatus comprising a distortion correcting unit, the distortion correcting unit performing distortion correction processing on input image data to generate output image data, the input image data having a distortion aberration corresponding to a distortion aberration characteristic of an imaging optical system, the distortion correcting unit outputting the output image data after the distortion correction processing, the distortion correcting unit comprising:
- a distortion correction coordinate transforming unit that obtains coordinates indicating a position of the input image data corresponding to a position of the output image data;
- a range calculating unit that calculates a range of the input image data to be used in the distortion correction processing based on the coordinates of the input image data obtained by the distortion correction coordinate transforming unit;
- a correction information storage unit that stores the coordinates of the input image data obtained by the distortion correction coordinate transforming unit and information regarding the range of the input image data calculated by the range calculating unit;
- an input image data storage unit that temporarily stores part of the input image data; and
- an interpolation calculating unit that checks an amount of the input image data stored in the input image data storage unit based on the information regarding the range of the input image data, which has been stored in the correction information storage unit, after the information regarding the range of the input image data is stored in the correction information storage unit, the interpolation calculating unit generating the output image data by carrying out an interpolation calculation on the input image data stored in the input image data storage unit based on the coordinates of the input image data stored in the correction information storage unit when the amount of the input image data stored in the input image data storage unit is greater than or equal to an amount necessary for the interpolation calculation, wherein
- a predetermined amount of the output image data, which is arranged in one row in a row direction within the output image data distributed in a two-dimensional matrix to be distortion-corrected and output, is designated as one line,
- a predetermined amount of the input image data, which is arranged in one row in the row direction within the input image data distributed in a two-dimensional matrix, is designated as one unit line,
- a plurality of unit lines are temporarily stored in the input image data storage unit,
- the interpolation calculating unit generates the output image data of the line after the distortion correction processing, and the distortion correction processing is performed based on the input image data included in the plurality of unit lines stored in the input image data storage unit, and
- the range calculating unit calculates a range of the input image data necessary for the interpolation of the line for each line unit, prior to the interpolation processing for generating the output image data of the line after the correction.

2. The image processing apparatus according to claim 1, wherein
the range calculating unit designates the unit line including the coordinates of the input image data corresponding to the output image data for which the interpolation calculation is first carried out by the interpolation calculating unit within the output image data included in the line to be distortion-corrected and output as a base, and
the range calculating unit calculates a first number of unit lines indicating the number of units maximally separated in a first direction perpendicular to the unit line serving as the base and a second number of unit lines indicating the number of unit lines maximally separated in a second direction reverse to the first direction as information regarding a range of the input image data, for the unit lines including the coordinates of the input image data corresponding to the output image data for which the interpolation calculation is subsequently carried out by the interpolation calculating unit.

3. The image processing apparatus according to claim 2, wherein
the correction information storage unit includes a plurality of storage areas each of which stores the coordinates of the input image data obtained by the distortion correction coordinate transforming unit and the information regarding the range of the input image data calculated by the range calculating unit, and
the correction information storage unit stores the coordinates of the input image data and the information regarding the range of the input image data for each line.

4. The image processing apparatus according to claim 2, wherein
the input image data storage unit temporarily stores the input image data of the plurality of unit lines for each unit line,
the interpolation calculating unit comprises a calculation control unit that checks the number of unit lines stored in the input image data storage unit based on the first number of unit lines and the second number of unit lines stored in the correction information storage unit, the calculation control unit controlling a start of the interpolation calculation based on a check result,
the calculation control unit starts the interpolation calculation of the interpolation calculating unit after checking whether unit lines of which the number is greater than or equal to a sum of the first number of unit lines and the second number of unit lines are stored in the input image data storage unit, and
the interpolation calculating unit generates each of the output image data included in the line by carrying out the interpolation calculation on the input image data of the plurality of unit lines stored in the input image data storage unit based on the coordinates of the input image data stored in the correction information storage unit.

5. The image processing apparatus according to claim 4, wherein
the correction information storage unit comprises:
- a coordinate storage unit that stores the coordinates of the input image data obtained by the distortion correction coordinate transforming unit in correspondence with each output image data included in the line of the output image data; and
- a unit line count storage unit that stores the first number of unit lines and the second number of unit lines calculated by the range calculating unit, the coordinate storage unit sequentially stores the coordinates of the input image data for the output image data included in the line, and
the unit line count storage unit stores the first number of unit lines and the second number of unit lines in the line stored by the coordinate storage unit one by one.

6. The image processing apparatus according to claim 4, further comprising:
- a line count check unit that checks the number of unit lines capable of being stored in the input image data storage unit based on the first number of unit lines and the second number of unit lines calculated by the range calculating unit, wherein the line count check unit stores the first number of unit lines and the second number of unit lines in the correction information storage unit if the sum of the first number of unit lines and the second number of unit lines is less than or equal to the number of unit lines capable of being stored in the input image data storage unit, and wherein the line count check unit outputs a signal indicating an error if the sum of the first number of unit lines and the second number of unit lines is greater than the number of unit lines capable of being stored in the input image data storage unit.

7. The image processing apparatus according to claim 1, wherein the distortion correction coordinate transforming unit comprises an interpolation position generating unit that generates an interpolation position indicating a position of each output image data included in the line of the output image data, and the distortion correction coordinate transforming unit transforms the interpolation position generated by the interpolation position generating unit into coordinates indicating a position of the input image data based on a transformation characteristic corresponding to a preset distortion aberration characteristic of the imaging optical system.

8. The image processing apparatus according to claim 1, wherein the distortion correction coordinate transforming unit sequentially obtains the coordinates of the input image data when there is a storage area capable of storing the coordinates of the input image data in the correction information storage unit, and the interpolation calculating unit checks the amount of the input image data stored in the input image data storage unit by reading the information regarding the range of the input image data from the correction information storage unit after the information regarding the range of the input image data is written to the correction information storage unit.

9. An image processing method comprising a distortion correcting step of performing distortion correction processing on input image data to generate output image data, the distortion correction processing having a distortion aberration corresponding to a distortion aberration characteristic of an imaging optical system, the distortion correction processing outputting the output image data after distortion correction processing, the distortion correcting step comprising:

a distortion correction coordinate transforming step of obtaining coordinates indicating a position of the input image data corresponding to a position of the output image data output by distortion correction processing, and storing the obtained coordinates of the input image data in a correction information storage unit;

a range calculating step of calculating a range of the input image data to be used in the distortion correction processing based on the coordinates of the input image data obtained by the distortion correction coordinate transforming step, and storing information regarding the calculated range of the input image data in the correction information storage unit; and an interpolation calculating step of reading the information regarding the range of the input image data from the correction information storage unit after the information regarding the range of the input image data calculated by the range calculating step is stored in the correction information storage unit, checking an amount of the input image data stored in an input image data storage unit based on the read information regarding the range of the input image data, reading the coordinates of the input image data from the correction information storage unit when the amount of the input image data stored in the input image data storage unit is greater than or equal to an amount necessary for an interpolation calculation, and generating the output image data by carrying out the interpolation calculation on the input image data stored in the input image data storage unit based on the read coordinates of the input image data, wherein a predetermined amount of the output image data, which is arranged in one row in a row direction within the output image data distributed in a two-dimensional matrix to be distortion-corrected and output, is designated as one line, a predetermined amount of the input image data, which is arranged in one row in the row direction within the input image data distributed in a two-dimensional matrix, is designated as one unit line, a plurality of unit lines are temporarily stored in the input image data storage unit, the interpolation calculating step generates the output image data of the line after the distortion correction processing, and the distortion correction processing is performed based on the input image data included in the plurality of unit lines stored in the input image data storage unit, and the range calculating step calculates a range of the input image data necessary for the interpolation of the line for each line unit, prior to the interpolation processing for generating the output image data of the line after the correction.

* * * * *